(12) United States Patent
Torrenegra et al.

(10) Patent No.: US 9,397,969 B2
(45) Date of Patent: Jul. 19, 2016

(54) ELECTRONIC SYSTEM AND METHOD FOR CREATION AND MANAGEMENT OF MEDIA CONTENT

(71) Applicant: BunnyForce, Inc., San Francisco, CA (US)

(72) Inventors: Alex Torrenegra, Secaucus, NJ (US);
Tania Zapata, Secaucus, NJ (US);
Abelardo Duarte-Rey, Bogota (CO);
Luis Molina, Bogota (CO); Henry Canastero-Prieto, Bogota (CO); Carlos Rodriguez-Lozano, Bogota (CO)

(73) Assignee: BunnyForce, Inc., San Francisco, CA (US)

( * ) Notice: Subject to any disclaimer, the term of this patent is extended or adjusted under 35 U.S.C. 154(b) by 457 days.

(21) Appl. No.: 13/729,257

(22) Filed: Dec. 28, 2012

(65) Prior Publication Data
US 2013/0174053 A1    Jul. 4, 2013

Related U.S. Application Data

(60) Provisional application No. 61/581,554, filed on Dec. 29, 2011.

(51) Int. Cl.
*G06F 3/048* (2013.01)
*H04L 12/58* (2006.01)
*H04L 12/18* (2006.01)

(52) U.S. Cl.
CPC .......... *H04L 51/046* (2013.01); *H04L 12/1836* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 7,197,459 | B1 | 3/2007 | Harinarayan et al. |
| 8,046,250 | B1 | 10/2011 | Cohen et al. |
| 8,266,011 | B2 | 9/2012 | Torrenegra et al. |
| 2010/0326256 | A1* | 12/2010 | Emmerson ...................... 84/610 |
| 2012/0041834 | A1* | 2/2012 | McRae, II .............. G06Q 30/02 705/26.3 |

OTHER PUBLICATIONS

VOICE123—The Voice Over Marketplace—Voice Overs, Voice Actors, and Talents, How it works for Buyers, available at voice123.com/doc/how-buyers.html, 2003-2013.
VOICE123—The Voice Over Marketplace—Voice Overs, Voice Actors, and Talents, How it works for Talents, available at voice123.com/doc/how-talents.html, 2003-2013.

* cited by examiner

*Primary Examiner* — William Trapanese
(74) *Attorney, Agent, or Firm* — Gordon & Jacobson, P.C.

(57) ABSTRACT

An electronic system (and corresponding method) for creating and managing media content involves at least one content management system (CMS) and a service. The CMS is configured to interact with at least one first-type user in order to create and manage media content for publication. The service is configured to interact with a plurality of second-type users in order to submit media content items that are associated with media content managed by the CMS and to store such media content items. Both the CMS and the service include corresponding interfaces that allow for exchange of electronic messages therebetween via network communications over the Internet, wherein the electronic messages conform to a predefined protocol.

30 Claims, 8 Drawing Sheets

FIG. 3A

Add project request

Description

Creates a new speedy project to obtain one voice recordings (read) quickly (see quickstart and flowchart). VoiceBunny will try to obtain the best voice(s) for the project, given *rewardAmount* and *lifetime* of the project.

Arguments

◎ = required
◎ = only one of these is required

| Name | Type | Description | Default value |
|---|---|---|---|
| script ◎ | text | Text that will be read by talents. Write instructions inside of [ ]. They won't count towards the word/character total. If you want to receive multiple files, submit the different parts as a JSON array, naming the key of each element anyway you wish (see extended example below). | |
| title ◎ | string | Descriptive text about the project of up to 50 characters. This text is the first reference that talents will have about your project. Using it wisely will help you attract more and better talents. | |
| genderAndAge | string | Gender and age wanted for the read. Valid values can be obtained with the /genderAndAges operation. | middleAgeAnyGender |
| language | string | Language (and regional accent) wanted for the read. Valid values can be obtained with the /languages operation. | eng-us |
| lifetime | integer | Lifetime of the project in seconds. When the number of seconds set have passed after the creation of the project, VoiceBunny won't allow talents to submit reads any longer. Longer lifetimes will give VoiceBunny more time to find a great voice, as talents with higher ratings will have more time to accept the project. Shorter lifetimes will force VoiceBunny to open up the project to talents with lower ratings. You can compensate lower lifetimes with higher rewards (see *rewardAmount*). | 84600 seconds (1 day) |
| secret | boolean | Set this argument to "1" to hide the details of this project from search engines. The price of the project will be 10% higher. | 0 |
| syncedRecording | integer | Set this argument to "1" if the recording needs to be synced. For example: synchronization with a video. The price of the project will be 50% higher. | 0 |
| test | boolean | Set this argument to "1" to test this operation. When set to "1", the project won't affect your account balance and it will automatically get a fake read within 120 seconds. | 0 |
| excludePrevious | integer | Number of your previous projects to be considered for excluding certain talents from working on this project. Use it to avoid getting the same voices you have received for your previous projects. | |
| ping | string | Use it to be notified as the project has new reads in status "reviewable". Possible values are:<br>Empty: No notifications will be sent.<br>"email": A message will be sent to your account's email address.<br>A valid email address: A message will be sent to the given email address.<br>A valid URL: The given URL will be called via a "get" request, expecting a 200, 201, or 202 response. You may use as many URL parameters as you need. | |
| price | float | Price paid for the project. If left empty, VoiceBunny will automatically set its default rates. You can learn in advanced what the value will be using the /projects/quote operation. Offering a higher price will attract our best talent to your project much faster. If you want help setting the price, contact Mr. VoiceBunny. | |
| remarks | text | Use this field to provide additional information to the talents. For example: type of read (movie trailer voice, commercial, phone greeting, etc.), links to videos, links to other reads you like, links to other project, links to images, etc. | |

FIG. 3B

```
Basic example
Groovy  Java  Node.js  PHP5  Python  Ruby

1.  @Grab(group='org.codehaus.groovy.modules.http-builder', module='http-builder', version='0.5.2')
2.
3.  import groovyx.net.http.*
4.  import groovy.json.*
5.  import static groovyx.net.http.ContentType.*
6.  import static groovyx.net.http.Method.*
7.
8.  def projectData = {
9.      script: 'Hello world.',
10.     title: 'My Test Project'
11. }
12.
13. http = new HTTPBuilder('https://api.voicebunny.com')
14. http.handler.success = {response, json -> return json}
15. http.handler.failure = {response, json -> throw new RuntimeException(json.error.code + ' ' + json.error.message)}
16. def voicebunnyUser = 'xxXXxx'
17. def voicebunnyToken = 'xxxxXXXXxxxxXXXX'
18. http.auth.basic voicebunnyUser, voicebunnyToken
19. def newProject = http.post(path: 'projects/addSpeedy', body: projectData, requestContentType: URLENC)
```

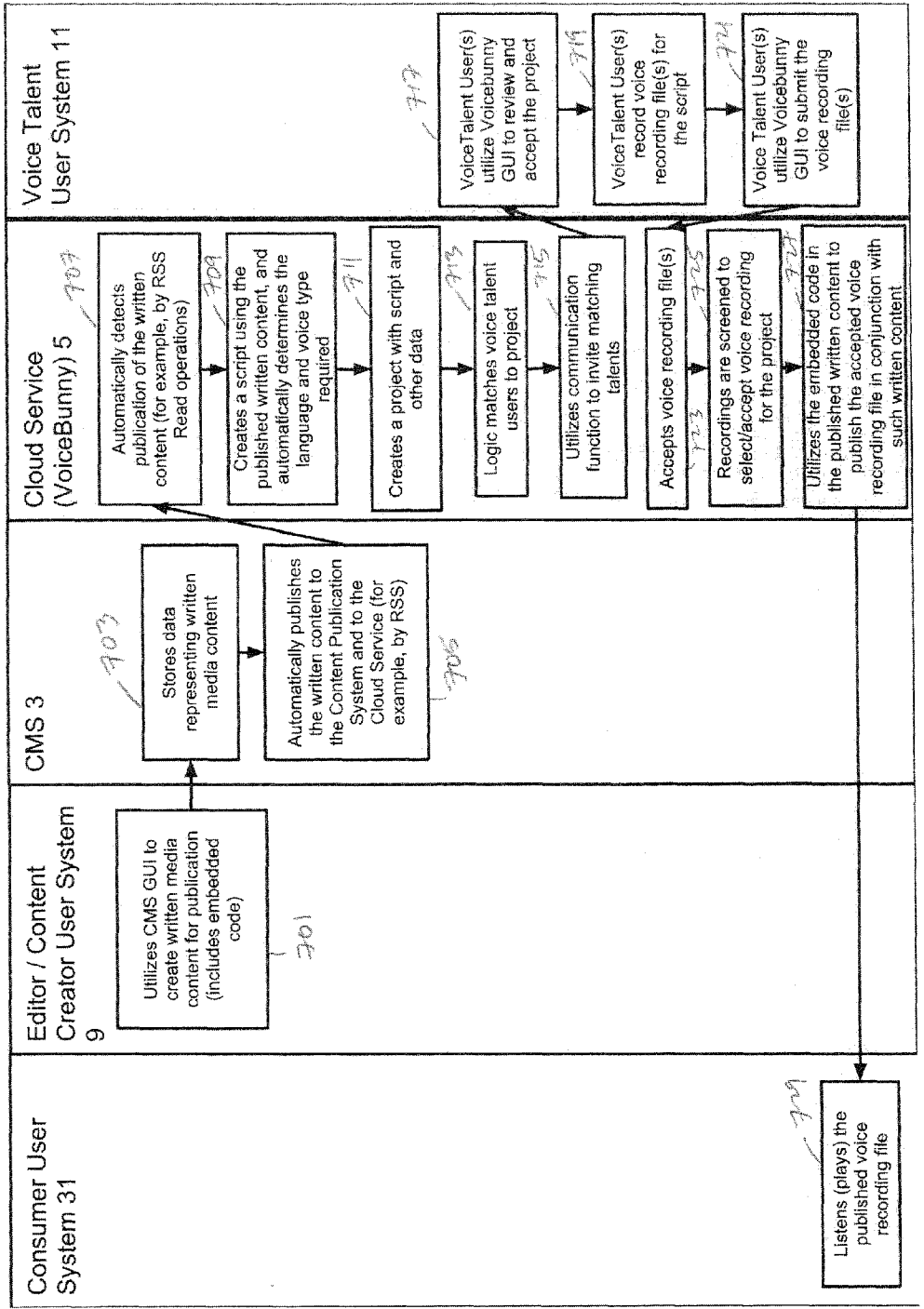

ELECTRONIC SYSTEM AND METHOD FOR CREATION AND MANAGEMENT OF MEDIA CONTENT

BACKGROUND

1. Field

The present invention relates to electronic systems and methods for creating and managing media content.

2. Related Art

Content management systems (CMSs) are computer applications (or hosted systems) that allow users to create, manage, store and deploy content on Web pages and in other forms of digital media. The content includes text and embedded graphics, photos, video, audio, and code (e.g., for applications) that displays content or interacts with the user. A CMS may catalog and index content, select or assemble content at runtime, or deploy (publish) content for distribution to the target audience.

Online marketplaces (such as the Amazon Mechanical Turk) have been developed that enable companies to programmatically access an on-demand workforce for tasks that human can do much more effectively than computers, such as identifying objects in a photo or video, performing data de-duplication, transcribing audio recordings or researching data details. Traditionally, tasks like this have been accomplished by hiring a large temporary workforce (which is time consuming, expensive and difficult to scale) or have gone undone. Such online marketplaces have also developed APIs that allow for integration of the online marketplace into applications.

Online Marketplaces for specific goods and services have also been developed and gained market acceptance. For example, the Voice123 marketplace (voice123.com) allows voice seekers ("buyers") to connect to and hire voice talent for specific projects. The voice seeker posts a project including the custom script that the voice seeker wants voice talents to record for an audition. The voice seeker (or the system) invites voice talents to submit voice recordings for the audition in accordance with the custom script. The voice talents submit their voice recordings for the audition along with quotes of their rates for the project. The voice seeker manages the voice recordings for the auditions by grading them, sharing them, downloading them, storing them, etc. The voice seeker can hire one of the voice talents for the project according to the quoted rates (or possibly negotiate a different rate).

SUMMARY

The embodiments of the present application involve a distributed electronic system that allows first-type users (e.g., media content creators or managers) of content management systems to act as buyers who create and manage projects where sellers provide media content items associated with published media content managed by the content management systems according to custom specifications supplied by the first-type users/buyers. The system includes one or more content management systems (CMSs) that interact with an online service over the Internet via respective messaging interfaces that conform to a predefined protocol. The predefined protocol is preferably published by the operator(s) of the online service.

The CMS is a networked computer system that executes software that is configured to interact with one or more first-type users over network communications to provide for the management, storage and deployment of media content for distribution to consumer users. The CMS can provide for website authoring, collaboration, and administrative tools that are designed to allow the first-type users with limited knowledge of web programming languages and/or web markup languages to create and manage media content with relative ease. The media content managed, stored and deployed by the CMS can include text and embedded graphics, photos, video, audio, and code (e.g., for applications) that displays content or interacts with the consumer users. Such media content can be embodied in web pages, digital advertisements or promotional material, applications (such as mobile applications), online newspapers, blogs, videos, radio ads, TV ads, ad networks, podcasts, videogames, animations, learning material, guided tours, political messages, phone systems, gifts, digital signage, or other forms of content delivery that distribute content to consumers.

The CMS of the system is further configured to allow the respective first-type user to act as a media content buyer who creates and manage projects that involve the solicitation for one or more media content items that are desired by the media content buyer. Such solicitation involves a request message communicated from the respective CMS to the online service over the Internet, where the request conforms to the predefined protocol supported by the system. The request message includes data that represents a custom specification for the desired media content item(s), where the custom specification is supplied by the first-type CMS user/buyer.

The online service is a networked computer system that executes software resources that are configured for specific tasks. The software resources of the online service include a CMS Interface that includes a messaging interface that conforms to the predefined protocol of the system to allow for interaction between the online service and the CMS(s) of the system over the Internet. The predefined protocol supported by the messaging interface of the CMS Interface allows the CMS interface to receive the request messages pertaining to specific projects as communicated from the respective CMS of the system. The CMS interface generates data related to such projects as specified by the received request messages and stores such data in a database. The stored data can also include project history data, profile data, and contact information for a given first-type user/buyer.

The predefined protocol of the system employs a user identifier (userid) and an authentication token (or authentication code) that is assigned to a given first-type user/buyer that accesses the online service. The authentication token is unique to the given first-type user/buyer. In this manner, the authentication token uniquely identifies the first-type user/buyer from other first-type users/buyers that access the online service. For each given first-type user/buyer, the userid and the authentication token are issued by the online service and stored in the database. The userid and the authentication token are also communicated to the given first-type user/buyer (for example, by email, SMS, chat or voice communication) or to the corresponding CMS directly, where it is stored and utilized by the CMS as part of its messaging interface to the online service. The userid and the authentication token assigned to a given first-type user/buyer is included as part of the requests communicated from the respective CMS to the online service for projects of the given first-type user/buyer. Both the userid and the authentication code are used by the CMS Interface of the online service to authenticate the given first-type user/buyer as the source of such request.

The software resources of the online service can also include matching logic that automatically matches second-type users (or sellers) of the online service to the projects. The automatic matching carried out by the matching logic can involve software processes that match details of a given project to the profiles of the second-type users/sellers as maintained in the database of the online service.

The software resources of the online service also include an interface that is configured to interact with the second-type users/sellers via network communications over the Internet to communicate with the second-type users/sellers (which can involve email, SMS or chat communication). Such communication can be used to communicate offers (or invitations) to one or more second-type users/sellers that have been matched or otherwise associated to a given project (for example, by the matching logic), where such offers notify the matched second-type user(s)/seller(s) of the given project. The notified second-type user/seller can accept the project and submit one or more media content items according to the custom specifications for the given project. The interface can include a GUI that is configured to interact with one or more second-type users/sellers to carry out a number of tasks associated with this process.

The CMS Interface of the online service can also be configured to cooperate with the appropriate CMS associated with a given project to notify such CMS that one or more media content items submitted by the second-type users/sellers for the given project are available, and possibly to transfer such media content items to the CMS for storage therein. The CMS can be configured to enable the first-type user/buyer of the given project to review of the one or more media content items submitted by the second-type users/sellers for the given project and possibly select (and/or accept) one or more of such media content items. Alternatively, this review process can be configured as a casting where the media content items submitted by the second-type users/sellers are auditions for the given project, and the first-type user/buyer of the given project selects one or more of such sellers for fulfilling the desired media content of the given project. Such fulfillment can be carried out via submission of media content items to the online service or possibly another communication mechanism.

The CMS can also include an interface that interacts with a Content Publication System (typically over the Internet) to transfer the media content managed by the CMS for online publication (distribution) by the Content Publication System. The media content transferred to the Content Publication System for publication can include web pages, digital advertisements or promotional material, and/or other applications (such as mobile applications) that distribute the content to consumers. Such media content can also include the media content item(s) submitted by the second-type users/sellers via interaction with the online service and associated with the projects maintained by the CMS. The Content Publication System can be part of a website, an advertising network, a media-delivery network, or a social network. Consumer user devices interact with the Content Publication System over the Internet to access the published media content.

In another aspect, the online cloud service can be configured to automatically detect the publication of media content by the CMS and obtain a copy of such media content. The cloud service can be further configured to analyze the copy of such published content to create a custom specification for related media content items based on the published content and to integrate the custom specification as part of a project that is fulfilled by one or more second-type users/sellers of the online service in a manner similar to the operations described above.

BRIEF DESCRIPTION OF THE DRAWINGS

FIGS. 3A and 3B are diagrams illustrating the details of an exemplary messaging protocol supported by the system of FIG. 1.

FIG. 7 is a schematic diagram of another exemplary operational workflow of the electronic system of FIG. 1 according to a fourth embodiment of the present application; in the operational workflow of FIG. 7, the cloud service 5 is configured to automatically receive and analyze a copy of content published by the CMS to create a script based on the published content and integrate the script as part of a project that is fulfilled by voice talent users of the cloud service.

DETAILED DESCRIPTION OF EXEMPLARY EMBODIMENTS

Figure 1:
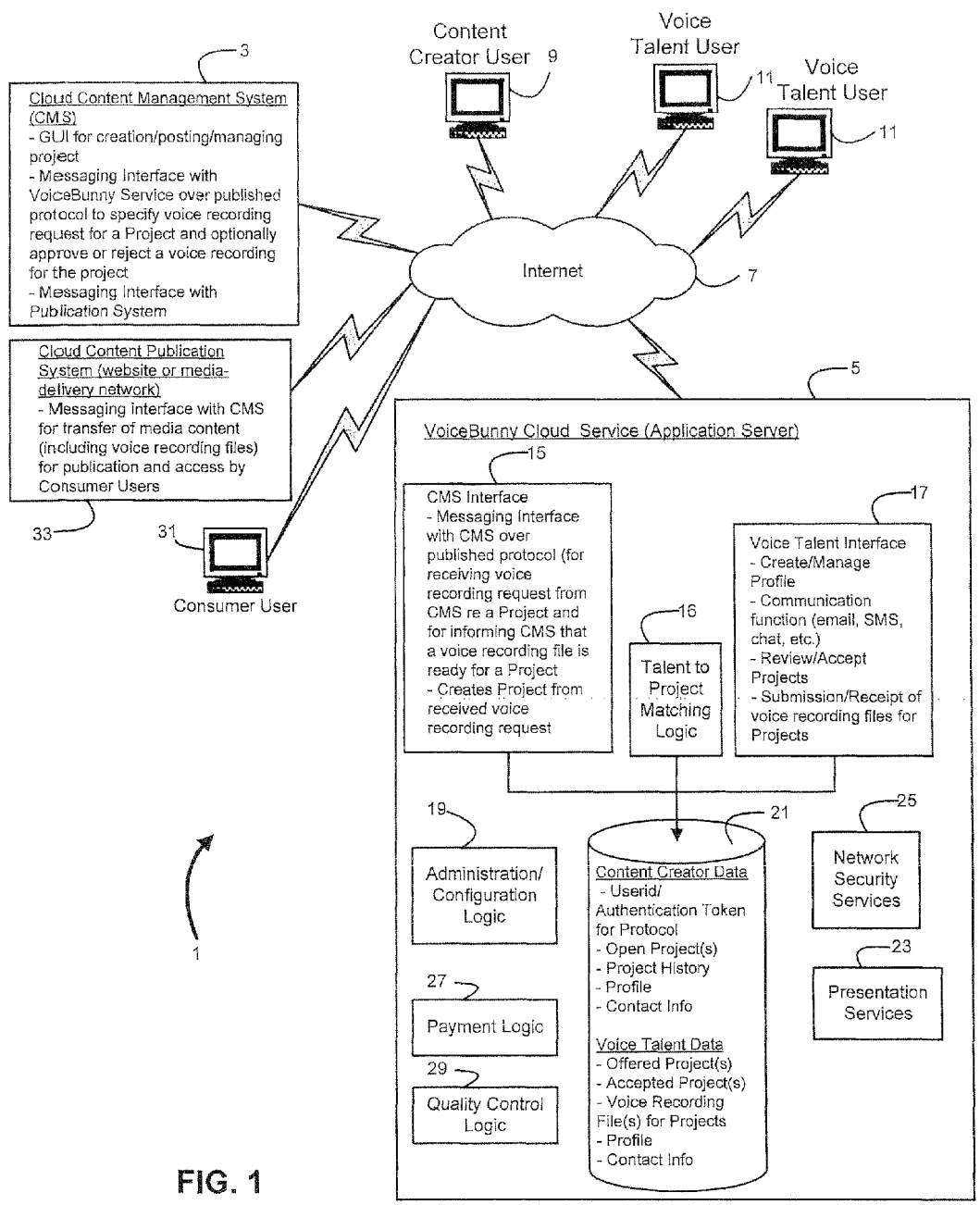
FIG. 1 is a schematic diagram of the system architecture of a distributed electronic system that allows content creators to create and manage projects where voice talent users provide voice recordings according to scripts supplied by the content creators for commercial needs.

Turning now to FIG. 1, there is shown the system architecture of a distributed electronic system 1 that allows content creators to create and manage projects where voice talent users provide voice recordings according to scripts supplied by the content creators for commercial needs. The system 1 includes a content management system (CMS) 3 and a cloud service 5 (which is referred to in the drawings as "Voice-Bunny") that interact with one another over the Internet 7 via respective messaging interfaces that conform to a predefined protocol. The predefined protocol is a system of digital message formats and rules for exchanging those messages in or between networked computing systems. The predefined protocol is preferably published by the operator(s) of the cloud service 5. FIGS. 3A and 3B show the details of an exemplary voice recording request that can be part of the predefined protocol used by the system.

The CMS 3 is a networked computer system that executes software that is configured to interact with one or more content creator users (one shown as 9) over network communications to provide for the management, storage and deployment of media content for distribution to consumer users. The CMS 3 can provide for website authoring, collaboration, and administrative tools that are designed to allow content creators with limited knowledge of web programming languages and/or web markup languages to create and manage media content with relative ease. The CMS 3 can provide for a number of functions, including:

- WYSIWYG editing of web page content, including editing text, adding images, embedding videos, creating links, embedding tags for search engine optimization, etc.
- mark-up editing of web content in HTML form for custom coding capabilities.
- uploading of photos, and adding titles and meta-data tags to the photos for search engine optimization.
- creating, editing and updating calendars and related events and forms.
- image editing, such as resizing, cropping and rotating.
- enabling visitor interaction by creating, managing and responding to unlimited forums and topics. Allow users to create their own topics or limit message board subjects to your liking.
- enabling dynamic loading of third-party web content by RSS Feeds.
- managing user system & permissions, such as customizing roles for each user to allow/deny access to view or edit certain content.
- form building to define and generate forms that are filled out by visitors as well as the management of such information.
- built-in search capabilities to help visitors quickly find what they need on the site.
- predefined templates and/or themes that can be customized by the user for web site creation.

The media content managed, stored and deployed by the CMS 3 can include text and embedded graphics, photos, video, audio, and code (e.g., for applications) that displays content or interacts with the consumer users. Such media content can be embodied in web pages, digital advertisements or promotional material, applications (such as mobile applications), online newspapers, blogs, videos, radio ads, TV ads, ad networks, podcasts, videogames, animations, learning material, guided tours, political messages, phone systems, gifts, digital signage, or other forms of content delivery that distribute content to consumers.

In accordance with the present application, the CMS 3 allows the content creator user systems 9 to create and manage projects that involve the solicitation for voice recording services that are desired by the content creator users. For example, the creation of script associated with certain content can trigger the CMS 3 to issue a voice recording request for the script. The voice recording request is generated by the messaging interface of the CMS 3 and is communicated from the CMS 3 to the cloud service 5 over the Internet 7. The voice recording request conforms to the predefined protocol supported by the system. The CMS 3 can be cloud-based such that the networked communication between the CMS 3 and the content creator user systems 9 are carried out over the Internet 7 as shown. Examples of commercially-available could-based CMS systems include Microsoft Sharepoint Online, a hosted Jommla platform, or a hosted Drupal platform. Alternatively, the networked communication between the CMS 3 and the content creator user systems 9 can be carried out over an intranet (LAN or WAN) or other suitable communication network. Examples of commercially-available intranet-based CMS systems include Microsoft Sharepoint Server, a Jommla platform, or a Drupal platform. The CMS 3 can also be part of advertising networks (such as Targetspot), a media delivery network (such as Pandora) or a social network (such as Facebook).

The cloud service 5 is networked computer system that executes software resources that are configured for specific tasks. The software resources of the cloud service 5 include a CMS Interface 15 that includes a messaging interface that conforms to the predefined protocol of the system to allow for interaction between cloud service 5 and the CMS 3 over the Internet 7. The predefined protocol supported by the messaging interface of the CMS Interface 15 allows the CMS interface 15 to receive voice recording requests pertaining to specific projects as communicated from the CMS 3. FIGS. 3A and 3B show the details of an exemplary voice recording request that can be part of the predefined protocol used by the system. The CMS interface 15 generates data related to such projects as specified by the voice recording requests communicated from the CMS 3 and stores such data (labeled "open projects") as part of Content Creator data records stored in database 21. Such Content Creator data records can also include project history data, profile data, and contact information for each given content creator user.

The predefined protocol of the messaging interface of the CMS Interface 15 and the corresponding messaging interface of the CMS 3 employs a user identifier (userid) and an authentication token (or authentication code) that is assigned to a given content creator user. The authentication token is unique to the given content creator user. In this manner, the authentication token uniquely identifies the given content creator from other content creator users that access the cloud service 5. For each given content creator user, the userid and the authentication token are issued by the cloud service 5 and stored in the Content Creator Data records of the database 21. The userid and the authentication token are also communicated to the given content creator user (for example, by email, SMS, chat or voice communication) or to the CMS directly, where it is stored and utilized by the CMS 3 as part of its messaging interface to the cloud service 5 for servicing voice recording requests that are part of projects maintained on the CMS 3 by the given content creator user. The userid and the authentication token assigned to a given content creator user is included as part of the voice recording requests communicated from the CMS 3 to the cloud service 5 for projects of the given content creator user. Both the userid and the authentication code are used by messaging interface of the CMS Interface 15 to authenticate the given content creator user as the source of such voice recording request.

The software resources of the cloud service 5 also include matching logic 16 that automatically matches voice talent users to the projects. The automatic matching carried out by the matching logic 16 can involve software processes that match details of a given project to the profiles of the voice talent user data records as maintained in the database 21.

The software resources of the cloud service 5 also include a Voice Talent Interface 17 that is configured to interact with one or more voice talent user systems (two shown as 11) via network communications over the Internet 7 to communicate with voice talent users (which can involve email, SMS or chat communication). Such communication can be used to communicate offers (or invitations) to one or more voice talent users that have been matched to a given project by the matching logic 16, where such offers notify the matched voice talent user(s) of the given project. The notified voice talent user can accept the project and submit a voice recording of the script for the given project. The Voice Talent Interface 17 employs a GUI that is configured to interact with one or more voice talent user systems to carry out a number of tasks associated with this process, which can include:

- creating and managing a user profile (which can include user information such as contact information, gender, age, spoken language(s), accent types, bank information for payments to the voice talent user, etc.);

reviewing and accepting certain projects; and
submitting voice recordings according to the scripts specified for the projects.

The database 21 stores Voice Talent User data records, which can include user profile data, project-related data (such as data identifying zero or more projects offered to a respective voice talent user and data identifying zero or more projects accepted by the respective voice talent user), and voice recording file(s) submitted by the respective voice talent user for a project.

The CMS Interface 15 of the cloud service 5 is also configured to cooperate with the CMS 3 corresponding to a given project to notify such CMS 3 that a respective voice recording submitted by a voice talent user for a project is available, and possibly to transfer such voice recording to the CMS 3 for storage therein.

The software resources of the cloud service 5 can also include Administration/Configuration Services 19, Presentation Services 23, and Network Security Services 25. The Administration/Configuration Services 19 is a facility that provides for system management and configuration of the software resources of the cloud service 5. The Presentation Services 23 is a facility that enables delivering dynamic content to the voice talent user machines 11. Preferably, the Presentation Services 23 support Active Server Pages, JavaServer pages, server-side scripting such as Perl, CGI, PL/SQL scripting, etc. The Network Security Services 25 is a facility that enables maintaining network security (such as SSL-based or IPSec-based encryption and authentication facilities). The Payment Logic 27 is a facility that enables the reception of payments from the content creator users via the CMS 3 and the management of payments to the voice talents. The Quality Control Logic 29 is a facility that enables the verification of quality of the voice recordings submitted by the voice talents. The Quality Control Logic 29 can use automated mechanisms, human contractors, and crowdsourcing services to accomplish its goals.

Preferably, the cloud services 5 is realized by a commercially-available software system, such as the JBoss platform commercially available from Redhat, Inc., the Websphere Application Server commercially available from IBM Corp., Windows Server Systems commercially available from Microsoft Corp., or the Weblogic Server platform commercially available from Oracle Corp.

The CMS 3 can also include a messaging interface that interacts with the messaging interface of a Content Publication System 33 over the Internet 7 to transfer the media content managed by the CMS 3 for publication (distribution) by the Content Publication System 33. The media content transferred to the Content Publication System 33 for publication can include web pages, digital advertisements or promotional material, and/or other applications (such as mobile applications) that distribute the content to consumers. Such media content can also include the voice recording files submitted by the voice talent users via interaction with the cloud system 5 and associated with the projects maintained by the CMS 3. The Content Publication System 33 can be part of a website, an advertising network, a media-delivery network, or a social network. Consumer user devices 31 interact with the Content Publication System 33 over the Internet 7 to access the published media content, including playing the voice recording files that is part of the published media content.

Figure 2:
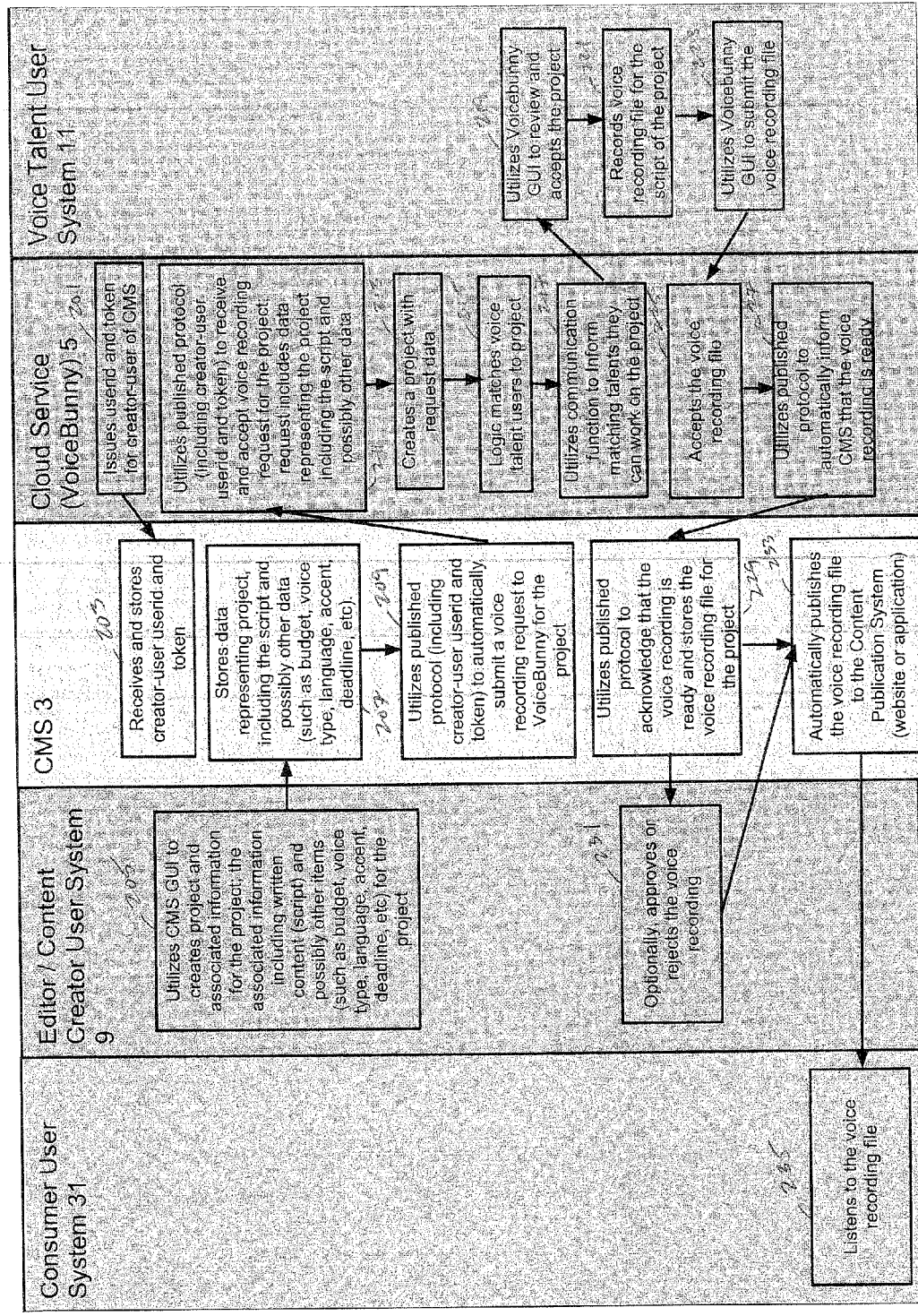
FIG. 2 is a schematic diagram of an exemplary operational workflow of the electronic system of FIG. 1 according to a first embodiment of the present application; the operational workflow of FIG. 5 allows for voice talent users of the cloud service to submit voice recording files that fulfills the needs of content creator(s) that operate the CMS for voice recording services.

Turning now to FIG. 2, there is shown a high-level representation of the operational workflow carried out by the system of FIG. 1. The operational workflow allows for the cloud service 5 to automatically fulfill the needs of content creator(s) that operate the CMS 3 for voice recording services supplied by voice talent. The operations begin in block 201 where the cloud service 5 issues a userid and authentication token that are uniquely assigned to a content creator user of the CMS 3. Both the userid and the authentication token can be communicated to the content creator user (or to the CMS system directly), where it is received and stored by the CMS 3 in block 203 for subsequent use. The cloud service 5 also stores the userid and the authentication token in the Content Creator Data records of the database 21.

In block 205, the content creator user operates the system 9 to interact with the GUI of the CMS 3 to create a project that involves the solicitation for voice recording services that are desired by the content creator users and to define information associated with project. Such information includes a script (i.e., a written text narrative of spoken words) for a desired voice recording and possibly other items (such as a budget, voice type, desired gender, language, access, deadline, etc.). In block 207, the CMS 3 stores the project information generated by the GUI in block 205.

In block 209, one or more certain events of the CMS 3 (such as the content creator user interacting with the GUI of the CMS to post the project for submission to the cloud service 5) triggers the messaging interface of the CMS 3 to automatically generate a voice recording request for the project for communication to the cloud service 5. The voice recording request conforms to the predefined protocol of the system and includes data representing the userid and the authentication token of the creator user that created the project. The voice recording request also includes data that represents the script for the project and possibly other information items for the project as stored in block 205.

In block 211, the CMS interface 15 of the cloud service 5 receives and accepts the voice recording request issued by the CMS in block 209 according to the predefined protocol. As described above, the CMS interface 15 utilizes the authentication token of the voice recording request to authenticate the content creator user of the project that issued the request.

In block 213, the CMS interface 15 of the cloud service 5 creates a project based upon the data of the voice recording request received in block 211, and stores data representing the project as part of the Content as part of the Content Creator Data records of the database 21.

In block 215, the matching logic 16 of the cloud service 5 automatically matches voice talent users to the project created in block 213. The automatic matching carried out by the matching logic 16 can involve software processes that match details of the given project to the profiles of the voice talent user data records as maintained in the database 21.

In block 217, the Voice Talent Interface 17 of the cloud service 5 communicates offers (or invitations) to one or more voice talent users that have been matched to a given project by the matching logic 16 in block 215. Such offers notify the matched voice talent user(s) of the given project.

Figure 4:
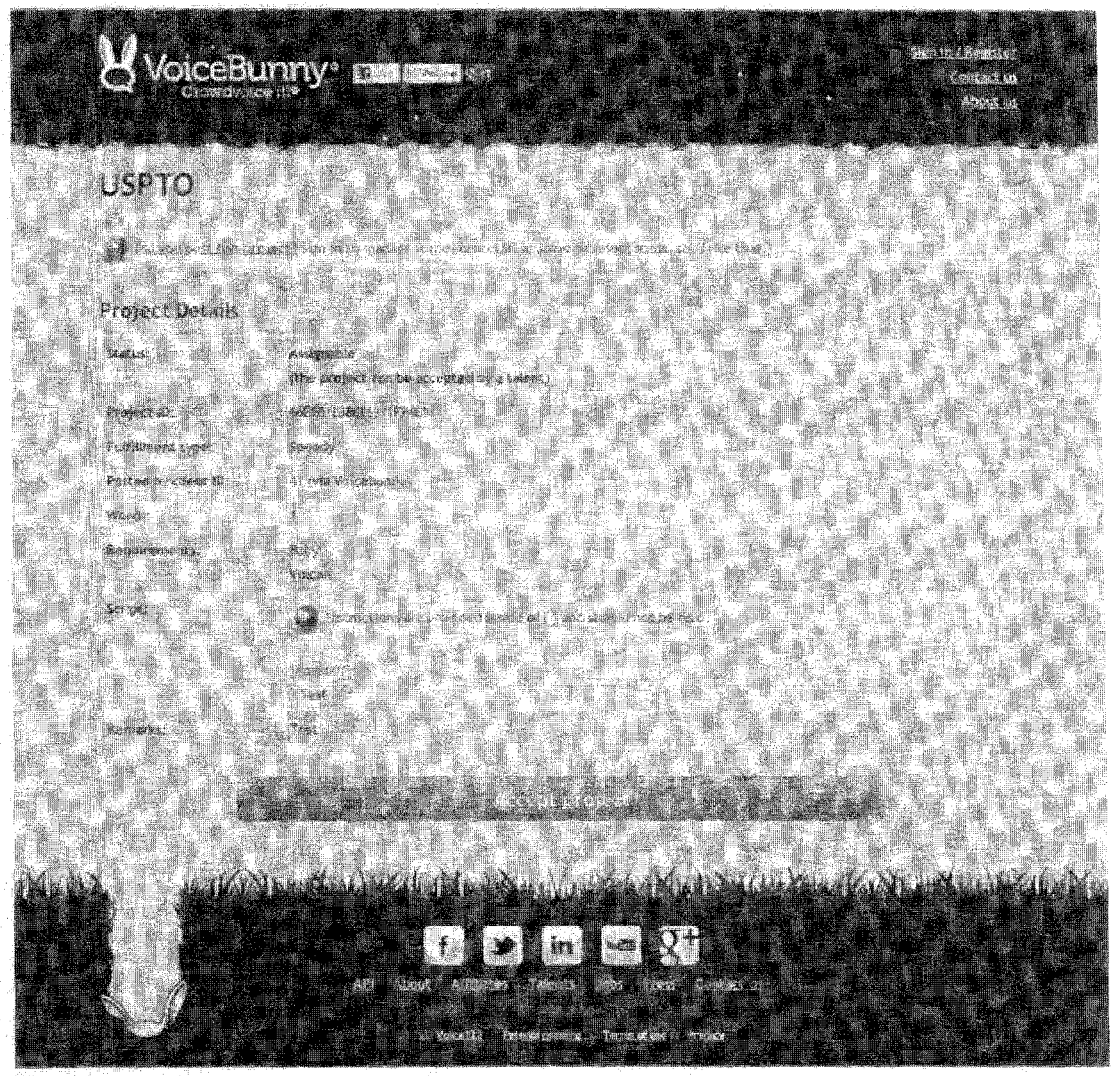
FIG. 4 is an illustration of an exemplary graphical user interface presented by the cloud service to voice talent users in order to review and accept an offer for a particular project as maintained by the cloud service of FIG. 1.

In block 219, the GUI of the Voice Talent Interface 17 of the cloud service 5 interacts with a voice talent user that was notified in block 217 and operates voice talent user system 11 to allow such voice talent user to review and accept the project. An example of this GUI is shown in FIG. 4.

In block 221, the voice talent user that accepted the project in block 219 records a voice recording file according to the script of the project.

In block 223, the GUI of the Voice Talent Interface 17 of the cloud service 5 interacts with the voice talent user that accepted the project in block 219 and operate voice talent user system 11 to allow for submission (e.g., upload) of the voice recording file recorded in block 221 to the cloud service 5.

In block 225, the Voice Talent Interface 17 of the cloud service 5 receives and accepts the voice recording file recorded in block 221 and submitted in block 223. Such voice record file is stored as part of the Voice Talent Data records of the database 21. The voice recording file(s) received in block 225 can be screened for quality. If multiple voice recording files are screened, the best quality voice recording file can be selected (accepted) for the project. The screening can be carried out by a human operator in a manual fashion, by an expert computer system in an automatic fashion, or in a semi-automatic fashion by a combination of the expert computer system and human operator.

In block 227, the CMS interface 15 of the cloud service 5 utilizes the messaging interface to the CMS 3 to communicate a status message that informs the CMS 3 that the voice recording is ready for the particular project. This status message conforms to the predefined protocol of the system.

In block 229, the messaging interface of the CMS 3 receives the status message communicated from the CMS interface 15 of the cloud service 5. It can acknowledge receipt of this status message. The voice recording file for the project can be part of the status message. In this case, the CMS 3 can receive and store the voice recording file locally. Alternatively, the cloud service 5 can provide a URL or other pointer for access to the voice recording file as stored in the database 21 of the cloud service 5. In this case, this URL (and not the actual voice recording file itself) can be part of the status message, where it is received and stored locally by the CMS 3.

In optional block 231, the content creator user interacts with the GUI of the CMS 3 (and/or via some other form of communication such as email, SMS, chat) to receive notification that the voice recording file is ready for the particular project, to review (including playing) the voice recording file for the project, and to approve or reject the voice recording file for the project.

One or more certain events (such as acceptance of the voice recording file in block 231 and/or other conditions, or possibly automatically upon receipt of the status message in block 229) trigger the operations of block 233 where the CMS 3 utilizes the messaging interface to the Content Publication System 33 for publication and distribution of the voice recording file. This can involve communicating the voice recording file itself to the Content Publication System 33. Alternatively, this can involve communicating the URL of the voice recording file to the Content Publication System 33.

In block 235, the Content Publication System 33 distributes media to consumer users to allow the consumer users to access the media content. As part of such distribution, the consumer users can access and play the voice recording file.

FIGS. 3A and 3B show details of any exemplary voice recording request that can be part of the predefined protocol of the system 1. The required arguments for the voice recording request include a script and title for the project. The optional arguments for the voice recording request include the following:

a string labeled "genderandage" for specifying gender and age criteria for the project;

a string labeled "language" for specifying a language criterion for the project;

an integer labeled "lifetime" for specifying duration of the project, where the duration limits the time for submission of voice recording files for the project;

a boolean labeled "secret" that specifies whether the project will be accessible or hidden from search engines;

an integer labeled "synchedRecording" that indicates whether the voice recording needs to be synched with video; the synchronization between the voice recording and the video can be performed by the voice talent user prior to submission;

a boolean labeled "test" for testing of the service for the particular project;

an integer labeled "excludePrevious" for filtering voice talent users; specifically the integer dictates the number of previous projects to be considered for excluding certain voice talent users from being offered to submit voice recording for the particular project;

a string labeled "ping" that controls the mechanism for notification that voice recording(s) is(are) ready for the particular project;

a floating point number labeled "price" that specifies the price to be paid by the content creator user for the voice recording of the particular project; and text labeled "remarks" that provides a field for additional comments of the content creator user.

Figure 5:
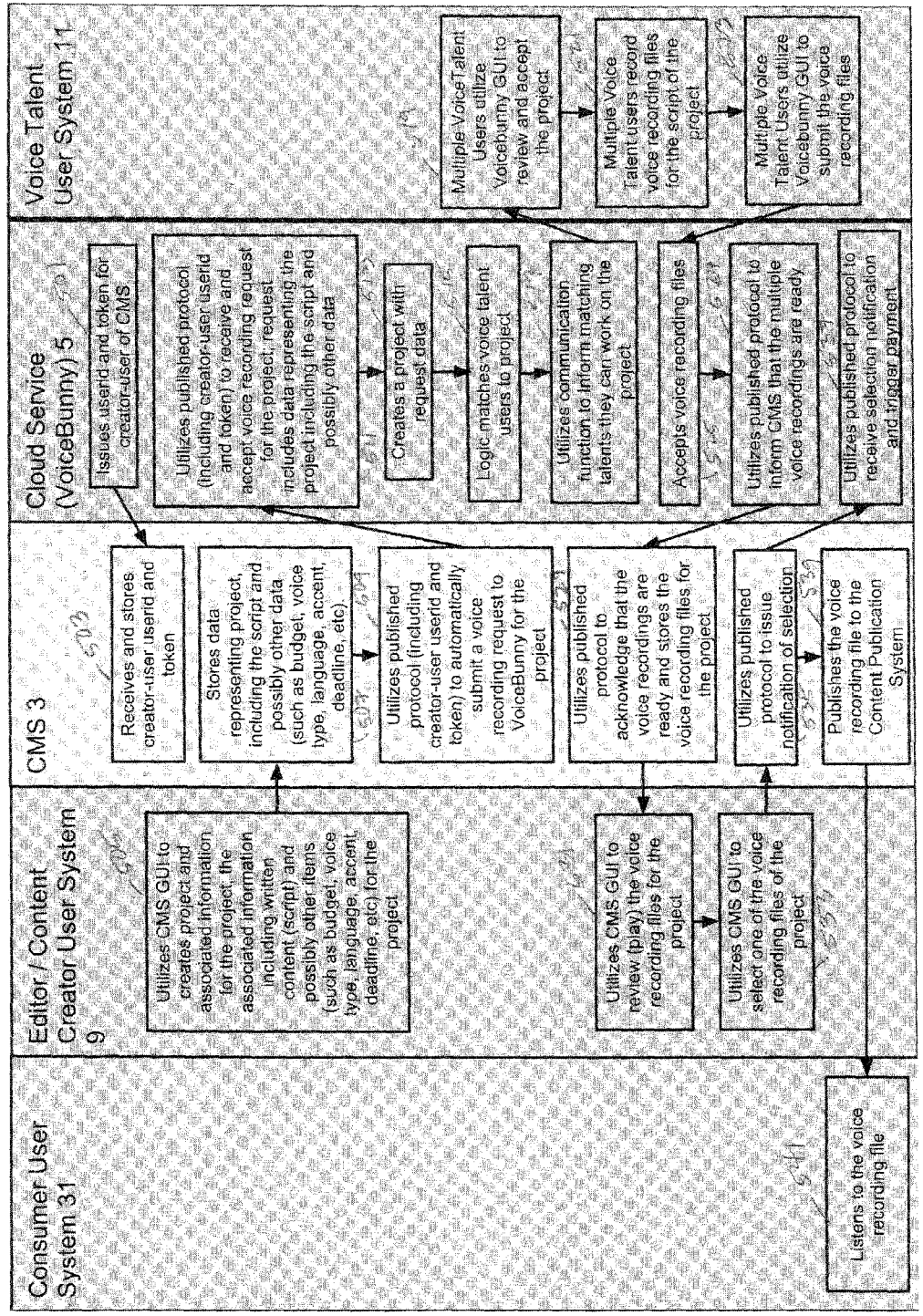
FIG. 5 is a schematic diagram of yet another exemplary operational workflow of the electronic system of FIG. 1 according to a second embodiment of the present application; the operational workflow of FIG. 5 allows for the cloud service to perform a collaborative contest amongst voice talent that fulfills the needs of content creator(s) that operate the CMS for voice recording services.

FIG. 5 shows a high-level representation of another operational workflow carried out by the system of FIG. 1. The operational workflow of FIG. 5 allows for the cloud service 5 to perform a collaborative contest amongst voice talent that fulfills the needs of content creator(s) that operate the CMS 3 for voice recording services. The operations begin in block 501 where the cloud service 5 issues a userid and authentication token that are uniquely assigned to a content creator user of the CMS 3. Both the userid and the authentication token can be communicated to the content creator user (or to the CMS system directly), where it is received and stored by the CMS 3 in block 503 for subsequent use. The cloud service 5 also stores the userid and the authentication token in the Content Creator Data records of the database 21.

In block 505, the content creator user operates the system 9 to interact with the GUI of the CMS 3 to create a project that involves the solicitation for voice recording services that are desired by the content creator users and to define information associated with project. Such information includes a script (i.e., a written text narrative of spoken words) for a desired voice recording and possibly other items (such as a budget, voice type, desired gender, language, access, deadline, etc.). In block 507, the CMS 3 stores the project information generated by the GUI in block 505.

In block 509, one or more certain events of the CMS 3 (such as the content creator user interacting with the GUI of the CMS to post the project for submission to the cloud service 5) triggers the messaging interface of the CMS 3 to automatically generate a voice recording request for the project for communication to the cloud service 5. The voice recording request conforms to the predefined protocol of the system and includes the userid and the authentication token of the creator user that created the project. The voice recording request also includes data that represents the script for the project and possibly other information items for the project as stored in block 505. The voice recording request can be similar in structure to the voice recording requests for the other operational workflows (FIGS. 2 and 7), but with a different message type and/or identifier to distinguish the two requests from one another.

In block 511, the CMS interface 15 of the cloud service 5 receives and accepts the voice recording request issued by the CMS in block 509 according to the predefined protocol. As described above, the CMS interface 15 utilizes the authentication token of the voice recording request to authenticate the content creator user of the project that issued the request.

In block 513, the CMS interface 15 of the cloud service 5 creates a project based upon the data of the voice recording request received in block 511, and stores data representing the project as part of the Content as part of the Content Creator Data records of the database 21.

In block 515, the matching logic 16 of the cloud service 5 automatically matches voice talent users to the project created in block 513. The automatic matching carried out by the matching logic 16 can involve software processes that match details of the given project to the profiles of the voice talent user data records as maintained in the database 21.

In block 517, the Voice Talent Interface 17 of the cloud service 5 communicates offers (or invitations) to one or more voice talent users that have been matched to a given project by the matching logic 16 in block 515. Such offers notify the matched voice talent user(s) of the given project.

In block 519, the GUI of the Voice Talent Interface 17 of the cloud service 5 interacts independently with multiple voice talent users that was notified in block 517 and operate voice talent user systems 11 to allow such multiple voice talent users to review and accept the project. An example of this GUI as presented to one voice talent user is shown in FIG. 4.

In block 521, multiple voice talent users that accepted the project in block 519 record their own voice recording files according to the script of the project.

In block 523, the GUI of the Voice Talent Interface 17 of the cloud service 5 interacts independently with the multiple voice talent users that accepted the project in block 519 and operate voice talent user systems 11 to allow for submission (e.g., upload) of the voice recording files recorded in block 521 to the cloud service 5.

In block 525, the Voice Talent Interface 17 of the cloud service 5 receives and accepts the multiple voice recording files recorded in block 521 and submitted in block 523. Such voice record files are stored as part of the Voice Talent Data records of the database 21.

In block 527, the CMS interface 15 of the cloud service 5 utilizes the messaging interface to the CMS 3 to communicate a status message that informs the CMS 3 that the multiple voice recordings are ready for the particular project. This status message conforms to the predefined protocol of the system.

In block 529, the messaging interface of the CMS 3 receives the status message communicated from the CMS interface 15 of the cloud service 5. It can acknowledge receipt of this status message. The voice recording files for the project can be part of the status message. In this case, the CMS 3 can receive and store the voice recording files locally. Alternatively, the cloud service 5 can provide URLs or other pointers for access to the voice recording files as stored in the database 21 of the cloud service 5. In this case, such URLs (and not the actual voice recording files themselves) can be part of the status message, where they are received and stored locally by the CMS 3.

In block 531, the content creator user interacts with the GUI of the CMS 3 (and/or via some other form of communication such as email, SMS, chat) to receive notification that the multiple voice recording file are ready for the particular project, and to review (including playing) the voice recording files for the project.

In block 533, the content creator user interacts with the GUI of the CMS 3 to select (accept) one of the multiple voice recording files as supplied in block 531.

The selection (acceptance) of the one voice recording file in block 533 (or possibly some other event) triggers the operations of block 535 where the CMS 3 utilizes the messaging interface to the cloud service 5 to provide a status message that provides notification of the voice recording file selected for the project in block 533.

In block 537, the CMS interface 15 of the cloud service 5 receives the status message communicated from the messaging interface of the CMS 3. It can acknowledge receipt of this status message. The receipt of such status message can trigger payment by the payment logic 27, where monetary funds from the content creator user are used to pay the particular voice talent user that recorded the voice recording file selected for the project in block 533.

In block 539, the CMS 3 utilizes the messaging interface to the Content Publication System 33 for publication and distribution of the selected voice recording file. This can involve communicating the voice recording file itself to the Content Publication System 33. Alternatively, this can involve communicating the URL of the voice recording file to the Content Publication System 33.

In block 541, the Content Publication System 33 distributes media to consumer users to allow the consumer users to access the media content. As part of such distribution, the consumer users can access and play the voice recording file.

Figure 6:
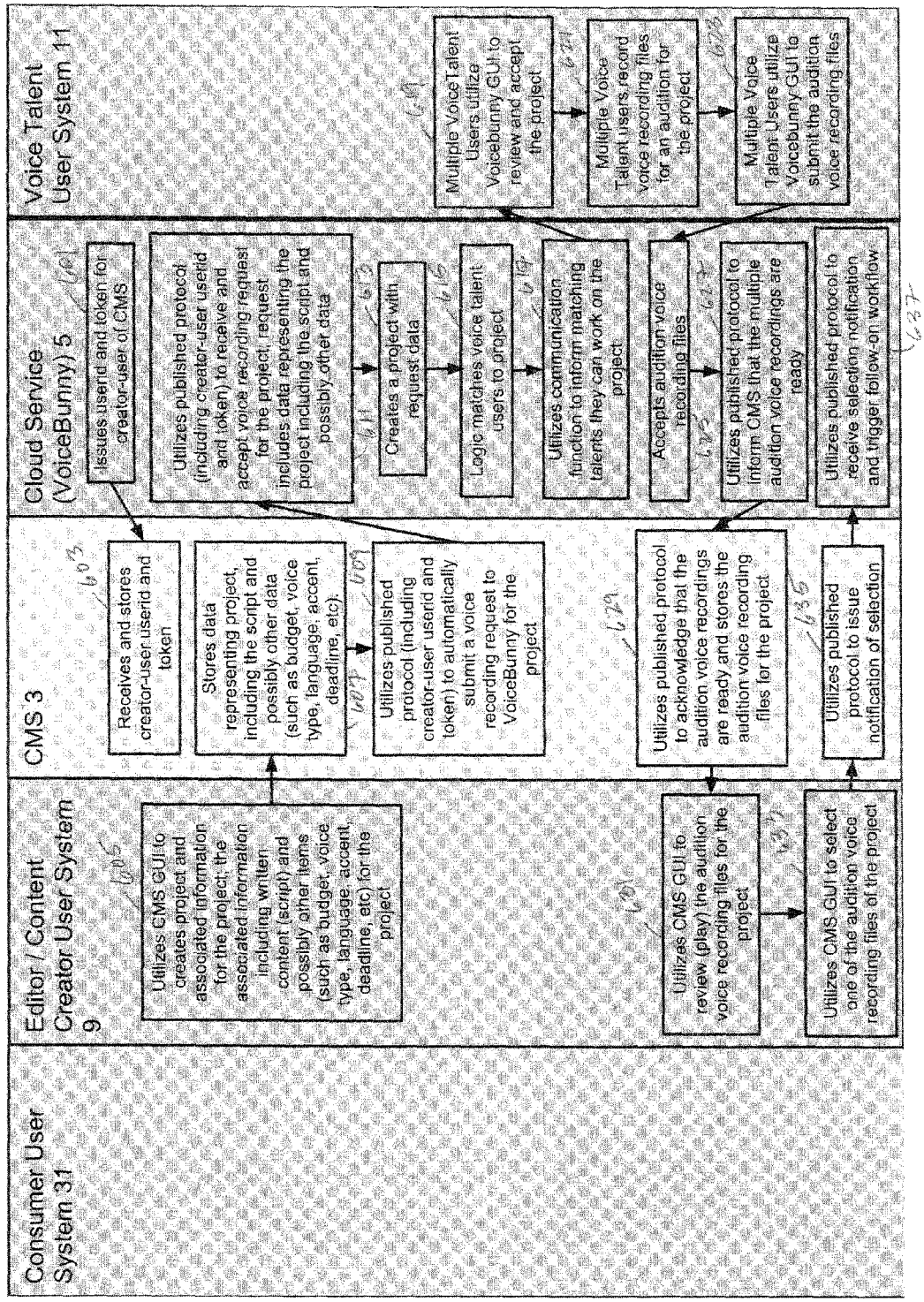
FIG. 6 is a schematic diagram of yet another exemplary operational workflow of the electronic system of FIG. 1 according to a third embodiment of the present application; the operational workflow of FIG. 6 allows for the cloud service to perform a casting of voice talent in order to fulfill the needs of content creator(s) that operate the CMS for voice recording services.

FIG. 6 shows a high-level representation of yet another operational workflow carried out by the system of FIG. 1. The operational workflow of FIG. 6 allows for the cloud service 5 to perform a casting of voice talent in order to fulfill the needs of content creator(s) that operate the CMS 3 for voice recording services. The operations begin in block 601 where the cloud service 5 issues a userid and authentication token that are uniquely assigned to a content creator user of the CMS 3. Both the userid and the authentication token can be communicated to the content creator user (or to the CMS system directly), where it is received and stored by the CMS 3 in block 603 for subsequent use. The cloud service 5 also stores the userid and the authentication token in the Content Creator Data records of the database 21.

In block 605, the content creator user operates the system 9 to interact with the GUI of the CMS 3 to create a project that involves the solicitation for voice recording services that are desired by the content creator users and to define information associated with project. Such information includes a script (i.e., a written text narrative of spoken words) for a desired voice recording and possibly other items (such as a budget, voice type, desired gender, language, access, deadline, etc.). In block 607, the CMS 3 stores the project information generated by the GUI in block 605.

In block 609, one or more certain events of the CMS 3 (such as the content creator user interacting with the GUI of the CMS to post the project for submission to the cloud service 5) triggers the messaging interface of the CMS 3 to automatically generate a voice recording request for the project for communication to the cloud service 5. The voice recording request conforms to the predefined protocol of the system and includes the userid and the authentication token of the creator user that created the project. The voice recording request also includes data that represents the script for the project and possibly other information items for the project as stored in block 605. The voice recording request can be similar in structure to the voice recording requests for the other operational workflows (FIGS. 2 and 6), but with a different message type and/or identifier to distinguish the two requests from one another.

In block 611, the CMS interface 15 of the cloud service 5 receives and accepts the voice recording request issued by the CMS in block 609 according to the predefined protocol. As described above, the CMS interface 15 utilizes the authentication token of the voice recording request to authenticate the content creator user of the project that issued the request.

In block 613, the CMS interface 15 of the cloud service 5 creates a project based upon the data of the voice recording request received in block 611, and stores data representing the project as part of the Content as part of the Content Creator Data records of the database 21.

In block 615, the matching logic 16 of the cloud service 5 automatically matches voice talent users to the project created in block 513. The automatic matching carried out by the matching logic 16 can involve software processes that match details of the given project to the profiles of the voice talent user data records as maintained in the database 21.

In block 617, the Voice Talent Interface 17 of the cloud service 5 communicates offers (or invitations) to one or more voice talent users that have been matched to a given project by the matching logic 16 in block 615. Such offers notify the matched voice talent user(s) of the given project.

In block 619, the GUI of the Voice Talent Interface 17 of the cloud service 5 interacts independently with multiple voice talent users that was notified in block 517 and operate voice talent user systems 11 to allow such multiple voice talent users to review and accept the project.

In block 621, multiple voice talent users that accepted the project in block 619 record their own voice recording files for an audition of the project. The audition can be part (or all) of the script of the project or some other text. The text for the audition can be defined by the content creator user as part of the project and specified by data communicated from the CMS 3 to the cloud service as part of the voice recording request (blocks 609 and 611).

In block 623, the GUI of the Voice Talent Interface 17 of the cloud service 5 interacts independently with the multiple voice talent users that accepted the project in block 619 and operate voice talent user systems 11 to allow for submission (e.g., upload) of the audition voice recording files recorded in block 621 to the cloud service 5.

In block 625, the Voice Talent Interface 17 of the cloud service 5 receives and accepts the multiple audition voice recording files recorded in block 621 and submitted in block 623. Such audition voice record files are stored as part of the Voice Talent Data records of the database 21.

In block 627, the CMS interface 15 of the cloud service 5 utilizes the messaging interface to the CMS 3 to communicate a status message that informs the CMS 3 that the multiple audition voice recordings are ready for the particular project. This status message conforms to the predefined protocol of the system.

In block 629, the messaging interface of the CMS 3 receives the status message communicated from the CMS interface 15 of the cloud service 5. It can acknowledge receipt of this status message. The audition voice recording files for the project can be part of the status message. In this case, the CMS 3 can receive and store the audition voice recording files locally. Alternatively, the cloud service 5 can provide URLs or other pointers for access to the audition voice recording files as stored in the database 21 of the cloud service 5. In this case, such URLs (and not the actual voice recording files themselves) can be part of the status message, where they are received and stored locally by the CMS 3.

In block 631, the content creator user interacts with the GUI of the CMS 3 (and/or via some other form of communication such as email, SMS, chat) to receive notification that the multiple audition voice recording file are ready for the particular project, and to review (including playing) the audition voice recording files for the project.

In block 633, the content creator user interacts with the GUI of the CMS 3 to select one of the multiple audition voice recording files as supplied in block 533 (or select a particular voice talent that recorded one of the multiple audition voice recording files as supplied in block 631).

The selection of the one audition voice recording file (or corresponding voice talent user) in block 633 (or possibly some other event) triggers the operations of block 635 where the CMS 3 utilizes the messaging interface to the cloud service 5 to provide a status message that provides notification of the audition voice recording file (or corresponding voice talent user) selected for the project in block 633.

In block 637, the CMS interface 15 of the cloud service 5 receives the status message communicated from the messaging interface of the CMS 3. It can acknowledge receipt of this status message. The receipt of such status message triggers follow-on operations where the one voice talent user selected for the project is notified of such selection, records a voice recording file according to the script of the project and submits the voice recording file to the cloud service 5 for delivery to the CMS 3 and publication. These operations are similar to the operations of blocks 217 to 235 of FIG. 2 as described above. As a result of such operations, the Content Publication System 33 distributes media to consumer users to allow the consumer users to access the media content. As part of such distribution, the consumer users can access and play the voice recording file submitted by the selected voice talent user.

In alternate embodiments, the CMS 3 need not be configured to submit voice recording requests to the cloud service 5 when content is published by the CMS 3. Instead, the cloud service 5 is configured to automatically detect the publication of such content by the CMS 3 and obtain a copy of such content. In one example, this can be accomplished by monitoring the RSS feed of the content published by CMS 3. The cloud service 5 can be further configured to analyze the copy of such published content to create a script based on the published content and integrate the script as part of a project that is fulfilled by voice talent users of the cloud service 5. FIG. 7 shows a high-level representation of an operational workflow carried out by the system of FIG. 1 that employs this scheme.

The operations of FIG. 7 begin in block 701 where the content creator user operates the system 9 to interact with the GUI of the CMS 3 to create content for publication. The content includes embedded code (such as javascript code) that represented a web programming language script that is used to serve (publish) a voice recording file associated therewith when the voice recording file in ready as described in block 727.

In block 703, the CMS 3 stores data represent the content created in block 701.

In block 705, the CMS 3 utilizes the messaging interface to the Content Publication System 33 for publication and distribution of the media content created in block 701 and stored in block 703 to consumer users. The CMS 3 also automatically communicates a copy of the media content to the cloud service 5. Such communication can be accomplished by an RSS Feed mechanism (or similar subscription-based feed mechanism) that is common in commercially available CMS platforms.

In block 707, the CMS interface 15 of the cloud service 5 receives the copy of the published media content as supplied by the CMS 23 in block 705 to automatically detect the publication of the media content. Such automatic detection functionality of the CMS interface 15 can be accomplished by an RSS Read mechanism (or similar subscription-based feed reader mechanism) that is common in commercially available software packages.

In block 709, the cloud service 5 processes the media content received in block 707 to automatically create a script (a text for spoken words) based on the published content. The processing can also automatically determine the language and voice type for the script. The language can be detected using commercially available software systems and APIs. The voice type can be determined by analyzing the popularity of certain voice types for previous voice recordings for similar projects.

In block 711, the cloud service 5 creates a project based on the script and possibly other data generated in block 709. The content creator associated with the project can be determined from the host name of the URL for the published content or from other data associated with the published content. Data representing the project as part of the Content as part of the Content Creator Data records of the database 21.

In block 713, the matching logic 16 of the cloud service 5 automatically matches voice talent users to the project created in block 711. The automatic matching carried out by the matching logic 16 can involve software processes that match details of the given project to the profiles of the voice talent user data records as maintained in the database 21.

In block 715, the Voice Talent Interface 17 of the cloud service 5 communicates offers (or invitations) to one or more voice talent users that have been matched to a given project by the matching logic 16 in block 713. Such offers notify the matched voice talent user(s) of the given project.

In block 717, the GUI of the Voice Talent Interface 17 of the cloud service 5 interacts with a voice talent user that was notified in block 715 and operates voice talent user system 11 to allow such voice talent user to review and accept the project. This GUI can be similar to the GUI shown in FIG. 4.

In block 719, the voice talent user that accepted the project in block 717 records a voice recording file according to the script of the project.

In block 721, the GUI of the Voice Talent Interface 17 of the cloud service 5 interacts with the voice talent user that accepted the project in block 717 and operates voice talent user system 11 to allow for submission (e.g., upload) of the voice recording file recorded in block 719 to the cloud service 5.

In block 723, the Voice Talent Interface 17 of the cloud service 5 receives and accepts the voice recording file recorded in block 719 and submitted in block 721. Such voice record file is stored as part of the Voice Talent Data records of the database 21.

The operations of blocks 717 to 723 can be perform for multiple voice talent users for soliciting multiple voice recording files from multiple voice talents, if desired.

In block 725, the voice recording file(s) received in block 723 are screened for quality. If multiple voice recording files are screened, the best quality voice recording file can be selected (accepted) for the project. The screening can be carried out by a human operator in a manual fashion, by an expert computer system in an automatic fashion, or in a semi-automatic fashion by a combination of the expert computer system and human operator.

In block 727, the CMS interface 15 of the cloud service 5 utilizes the embedded code of the published content to publish the voice recording file selected (accepted) in block 725 in conjunction with the published content. More specifically, the embedded code represents a web programming language script that is used to serve (publish) the voice recording file in conjunction with the published content.

In block 729, the Content Publication System 33 distributes media to consumer users to allow the consumer users to access the media content. As part of such distribution, the consumer users can access and play the voice recording file by invocation of the embedded code, which operates to serve (publish) the voice recording file to the requesting consumer user.

The embodiment of FIG. 7 can be adapted to allow for the cloud service to automatically create podcasts (or other audio files) that represent the spoken words of text or other forms of published written media and publish such audio files in conjunction with published written media such that the audio files accompany the corresponding the published written media. For example, a podcast can be automatically integrated into a blog for a corresponding section of the published blog, where the podcast represents the spoken words of the corresponding blog section.

In the embodiments described herein, the cloud service can improve the quality of the voice recording(s) submitted by voice talent users by dynamically limiting the amount of talents that are allowed to perform the work. For example, after a request is posted to the cloud service, the cloud service can initially allow only a small set of voice talent users to accept the work. If the request hasn't been fulfilled in a system-defined time window (or reserved by a talent so that he/she can do the work), the cloud service can increase the size of the pool of talent users and notifies them. The process continues over successive time windows until the request is fulfilled (or reserved). The speed of the process can be determined by several factors, including the budget of the work, or its deadline. The order in which talent users are added to the pool can be determined by data maintained by the cloud service and associated with the given voice talent users (such as a performance rating (or other performance-related parameter) for the given voice talent user, an indicator of the price that the given voice talent user charges as compared to other voice talent users (or other price-related parameter), etc.). Furthermore, the number of voice talent users that are invited to accept a given project can depend on the budget of the project. A higher budget will allow more talents to compete. A lower budget will limit the numbers of talents competing.

The pricing and payment for projects can have many variations. For example, the content creator can set the price of the project as part of the request. The payment for the project can be supplied by the content creator (or the CMS automatically) upon acceptance of the voice recording file for the project. It is also contemplated that the content creator (or the CMS automatically) can prepay the cloud service for the voice recording(s) for a given project. This can simplify the process and can make the requested work more attractive to voice talent users. Alternatively, the cloud service can allow the content creators (or CMSs) to submit requests for projects without determining a price or budget. The price that the content creator buyer will have to pay is calculated automatically by the cloud service. In one embodiment, the price calculations are based on analysis of historical data of the marketplace. The cloud service can set the price in real-time as the project gets posted, or allow the content creator buyer (or CMS automatically) to quote the price before issues the request for the project. The fee that the content creator buyer pays can be different or independent from the payment made to the voice talent. In one example, the cloud service can offer free projects to content creator buyers while still paying voice talent for the projects.

Additionally, the method can allow editors, other talent users, or other users to submit comments for each voice recording. Talents can then have the option of rerecord and resubmit their voice recordings.

The system and operational workflows described herein can also be used in other applications. In particular, the systems, methodologies and alternatives can be applied to applications that require the creation and fulfillment of media content items that are intended to accompany particular published media content managed by a CMS, where the media content items are supplied by sellers according to predefined specifications provided by buyers in exchange for payment between the buyers and the sellers. For example, the media content items can be graphic design elements (such as logos, slogans, brand names, trademarks, etc.), photographs and photograph editing, audio production (such as dubbing), video production, video editing, music, audio, special effects, animation, 3d modeling, and mobile apps.

There have been described and illustrated herein several embodiments of a distributed electronic system that provides for the creation and fulfillment of media content items that are intended to accompany particular published media content, where the media content items are supplied by sellers according to predefined specifications provided by buyers in exchange for payment between the buyers and the sellers. While particular embodiments of the invention have been described, it is not intended that the invention be limited thereto, as it is intended that the invention be as broad in scope as the art will allow and that the specification be read likewise. Thus, while particular operational workflows and graphical user interfaces have been disclosed, it will be appreciated that other operational workflows and graphical user interfaces can be used as well. In addition, while particular types of messaging and communication protocols have been disclosed, it will be understood that other types of messaging and communication protocols can be used. Furthermore, while particular configurations have been disclosed in reference to content management system, it will be appreciated that other configurations could be used as well. It will therefore be appreciated by those skilled in the art that yet other modifications could be made to the provided invention without deviating from its spirit and scope as claimed.

What is claimed is:

1. An electronic system for creating and managing media content comprising:
    a content management system (CMS) comprising a first networked computer system that is configured to interact with at least one first-type user in order to manage media content items for publication; and
    a service comprising a second networked computer system that is configured to interact with a plurality of second-type users in order to create and submit media content items for management by the CMS;
    wherein both the first networked computer system of the CMS and the second networked computer system of the service include corresponding interfaces that allow for exchange of electronic messages therebetween via network communications over the Internet, wherein the electronic messages conform to a predefined protocol;
    wherein the first networked computer system of the CMS is configured to communicate at least one request message to the service, wherein the request message includes data that represents a specification for a media content item to be created and submitted by at least one second-type user of the service; and
    wherein the second networked computer system of the service is configured to initiate payment to at least one second-type user of the service with respect to a media content item that is created and submitted by at least one second-type user of the service in response to the request message.

2. An electronic system according to claim 1, wherein:
    the second networked computer system of the service is configured to receive and store at least one media content item that is created and submitted by at least one second-type user of the service and that is intended to fulfill the specification represented by the data of the request message; and
    the first networked computer system of the CMS is configured to allow a first-type user of the CMS to accept at least one media content item received by the service.

3. An electronic system according to claim 2, wherein:
    the request message further includes data that represents terms related to payment between the first-type user and at least one second-type user of the service that creates and submits a media content item that fulfills the specification represented by the request message.

4. An electronic system according to claim 1, wherein:
    the second networked computer system of the service is configured to screen at least one media content item created and submitted by at least one second-type user of the service for selection of at least one media content item and for communication of a notification message from the service to the CMS whereby the notification message includes or identifies the selected at least one media content item.

5. An electronic system according to claim 1, wherein:
    the second networked computer system of the service is configured to communicate a notification message from the service to the CMS whereby the notification message includes or identifies at least one media content item created and submitted by at least one second-type user of the service in response to the request message.

6. An electronic system according to claim 5, wherein:
    the first networked computer system of the CMS is configured to interact with a first-type user of the CMS in order to review and accept at least one media content item that is included or identified by such notification message.

7. An electronic system according to claim 6, wherein:
    the first networked computer system of the CMS is further configured to publish the accepted at least one media content item.

8. An electronic system according to claim 1, wherein:
    the first networked computer system of the CMS is further configured to publish at least one media content item created and submitted by the at least one second-type user of the service.

9. An electronic system according to claim 1, wherein:
    the second networked computer system of the service is configured to provide for payment between a particular first-type user of the CMS and at least one second-type user of the service in exchange for creation and submission of at least one media content item by the at least one second-type user of the service in accordance with the request message communicated from the CMS to the service.

10. An electronic system according to claim 1, wherein:
    the at least one media content item created and submitted by at least one second-type user of the service comprises a voice recording file, and the data representing a specification of the voice recording file includes script data representing a text of the spoken word(s) of the voice recording file.

11. An electronic system according to claim 1, wherein:
    the at least one media content item created and submitted by at least one second-type user of the service comprises a plurality of audition voice recording files, and the data representing a specification of the audition voice recording files includes script data representing a text of the spoken word(s) of the audition voice recording files.

12. An electronic system according to claim 1, wherein:
the at least one media content item created and submitted by at least one second-type user of the service comprises a voice recording file, and the data representing a specification of the voice recording file includes data selected from the group consisting of:
data representing a text of the spoken word(s) of the voice recording file;
data specifying a gender criterion of recorded voice of the voice recording file;
data specifying an age criterion of recorded voice of the voice recording file;
data specifying a language criterion of the recorded voice of the voice recording file;
data specifying a duration that second-type users can submit voice recording files for a given request message;
data used for filtering second-type users of the service from being offered to submit voice recording files for a given request message; and
data representing a price to be paid to the first-type user that fulfills the at least one voice recording file for a given request message.

13. An electronic system according to claim 1, wherein:
the first networked computer system of the CMS provides functionality selected from the group consisting of
WYSIWYG editing of web page content;
mark-up editing of web content in HTML form;
uploading of photos, and adding titles and meta-data tags to the photos;
creating, editing and updating calendars and related events and forms;
image editing;
visitor interaction;
dynamic loading of third-party web content;
manages user system & permissions;
form building to define and generate forms that are filled out by visitors;
search capabilities; and
predefined templates and/or themes.

14. An electronic system according to claim 1, wherein:
the messages of predefined protocol supported by the interfaces of the first networked computer system of the CMS and the second networked computer system of the service allow for the CMS to automatically communicate to the service a copy of published media content and for the service to automatically receive the copy of the published media content and process the published media content in order to request the submission of at least one media content item associated with the published media content by at least one second-type user of the service.

15. An electronic system according to claim 14, wherein:
the copy of the published media content includes data for publishing at least one media content item submitted by the at least one second-type user of the service in conjunction with the published media content.

16. A method for creating and managing media content comprising:
operating a content management system (CMS) comprising a first networked computer system that is configured to interact with at least one first-type user in order to manage media content items for publication;
operating a service comprising a second networked computer system that is configured to interact with a plurality of second-type users in order to create and submit media content items for management by the CMS;
wherein the operating of both the first networked computer system of the CMS and the second networked computer system of the service involves the exchange of electronic messages via network communications over the Internet, wherein the electronic messages conform to a predefined protocol;
wherein the operating of the first networked computer system of the CMS involves communicating at least one request message to the service, wherein the request message includes data that represents a specification for a media content item to be created and submitted by at least one second-type user of the service; and
wherein the operating of the second networked computer system of the service involves initiating payment to at least one second-type user of the service with respect to a media content item that is created and submitted by at least one second-type user of the service in response to the request message.

17. A method according to claim 16, wherein:
the operating of the second networked computer system of the service involves receiving and storing at least one media content item that is created and submitted by at least one second-type user of the service and that is intended to fulfill the specification represented by the data of the request message; and
the operating of the first networked computer system of the CMS involves a first-type user of the CMS accepting at least one media content item received by the service.

18. A method according to claim 17, wherein:
the request message further includes data that represents terms related to payment between the first-type user and at least one second-type user of the service that creates and submits a media content item that fulfills the specification represented by the request message.

19. A method according to claim 16, wherein:
the operating of the second networked computer system of the service involves screening at least one media content item created and submitted by at least one second-type user of the service for selection of at least one media content item and communicating a notification message from the service to the CMS whereby the notification message includes or identifies the selected at least one media content item.

20. A method according to claim 16, wherein:
the operating of the second networked computer system of the service involves communication of a notification message from the service to the CMS whereby the notification message includes or identifies at least one media content item created and submitted by at least one second-type user of the service in response to the request message.

21. A method according to claim 20, wherein:
the operating of the first networked computer system of the CMS involves interacting with a first-type user of the CMS in order to review and accept at least one media content item that is included or identified by such notification message.

22. A method according to claim 21, wherein:
the operating of the first networked computer system of the CMS further involves publishing the accepted at least one media content item.

23. A method according to claim 16, wherein:
the operating of the first networked computer system of the CMS further involves publishing at least one media content item created and submitted by the at least one second-type user of the service.

24. A method according to claim 16, wherein:
the operating of the second networked computer system of the service involves payment between a particular first-type user of the CMS and at least one second-type user of the service in exchange for creation and submission of at least one media content item by the at least one second-type user of the service in accordance with the request message communicated from the CMS to the service.

25. A method according to claim 16, wherein:
the at least one media content item created and submitted by the at least one second-type user of the service comprises a voice recording file, and the data representing a specification of the voice recording file includes script data representing a text of the spoken word(s) of the voice recording file.

26. A method according to claim 16, wherein:
the at least one media content item created and submitted by the at least one second-type user of the service comprises a plurality of audition voice recording files, and the data representing a specification of the audition voice recording files includes script data representing a text of the spoken word(s) of the audition voice recording files.

27. A method according to claim 16, wherein:
the at least one media content item created and submitted by the at least one second-type user of the service comprises a voice recording file, and the data representing a specification of the voice recording file includes data selected from the group consisting of:
   data representing a text of the spoken word(s) of the voice recording file;
   data specifying a gender criterion of recorded voice of the voice recording file;
   data specifying an age criterion of recorded voice of the voice recording file;
   data specifying a language criterion of the recorded voice of the voice recording file;
   data specifying a duration that second-type users can submit voice recording files for a given request message;
   data used for filtering second-type users of the service from being offered to submit voice recording files for a given request message; and
   data representing a price to be paid to the first-type user that fulfills the at least one voice recording file for a given request message.

28. A method according to claim 16, wherein:
the operating of the first networked computer system of the CMS includes a function selected from the group consisting of
   WYSIWYG editing of web page content;
   mark-up editing of web content in HTML form;
   uploading of photos, and adding titles and meta-data tags to the photos;
   creating, editing and updating calendars and related events and forms;
   image editing;
   visitor interaction;
   dynamic loading of third-party web content;
   manages user system & permissions;
   form building to define and generate forms that are filled out by visitors;
   search capabilities; and
   predefined templates and/or themes.

29. A method according to claim 16, wherein:
the messages of predefined protocol supported by the first networked computer system of the CMS and the second networked computer system of the service allow for the CMS to automatically communicate to the service a copy of published media content and for the service to automatically receive the copy of the published media content and process the published media content in order to request the submission of at least one media content item associated with the published media content by at least one second-type user of the service.

30. A method according to claim 29, wherein:
the copy of the published media content includes data for publishing at least one media content item submitted by the at least one second-type user of the service in conjunction with the published media content.

* * * * *